Figure 6:
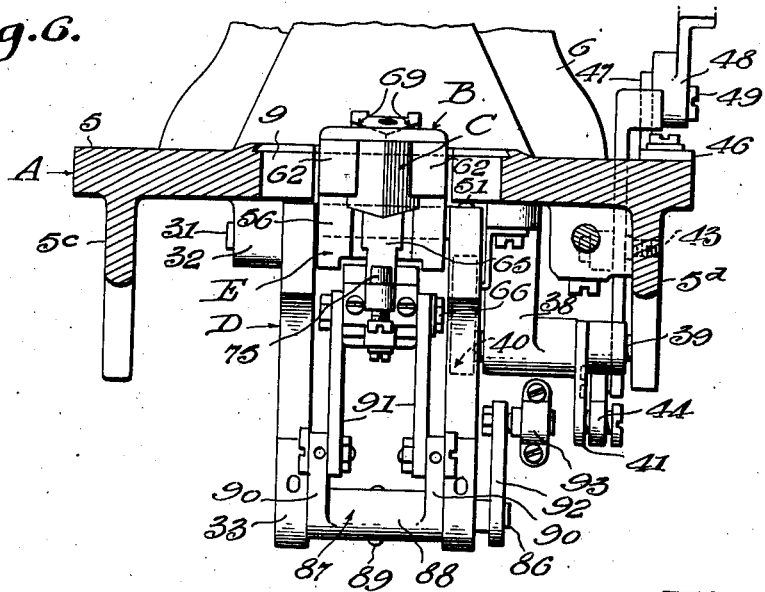

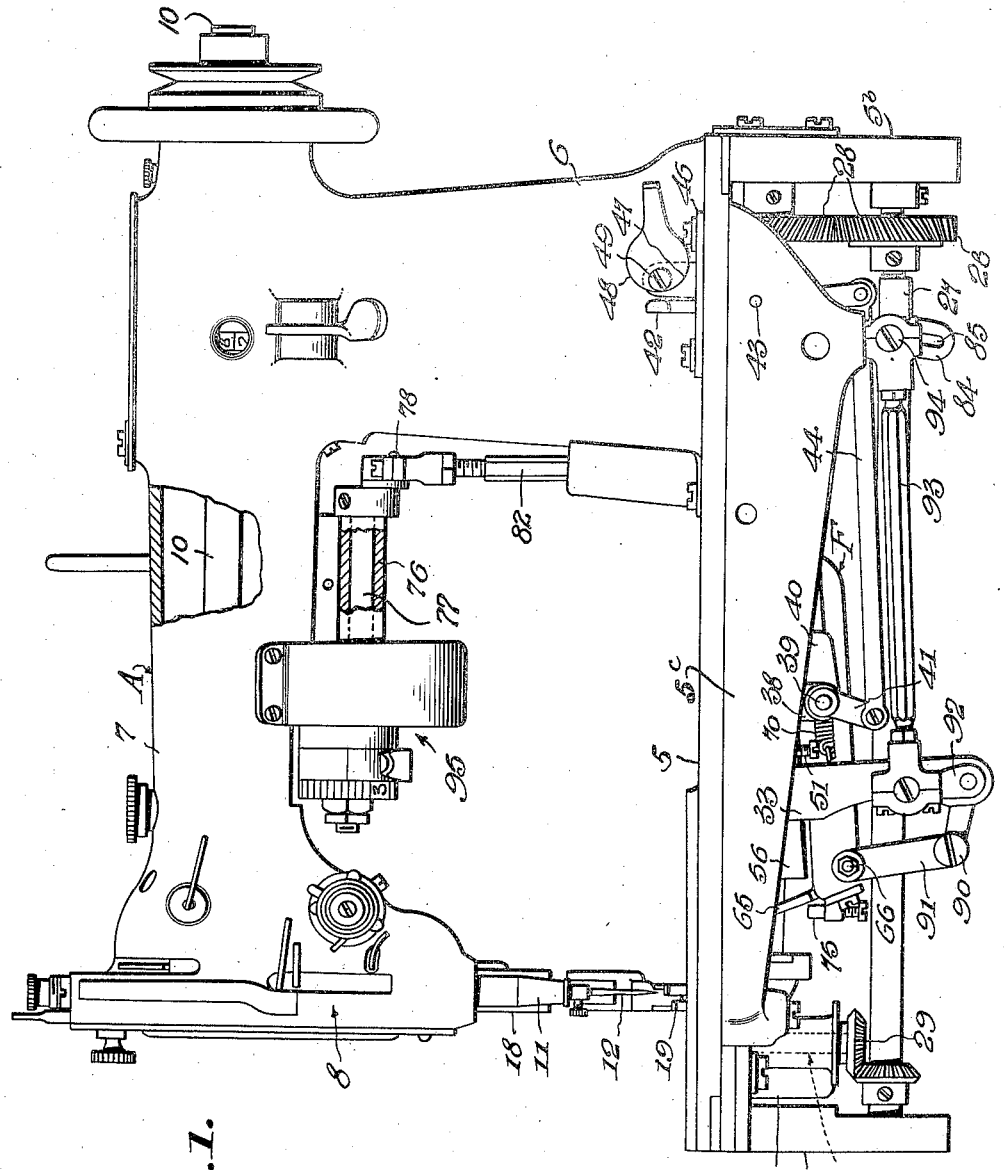

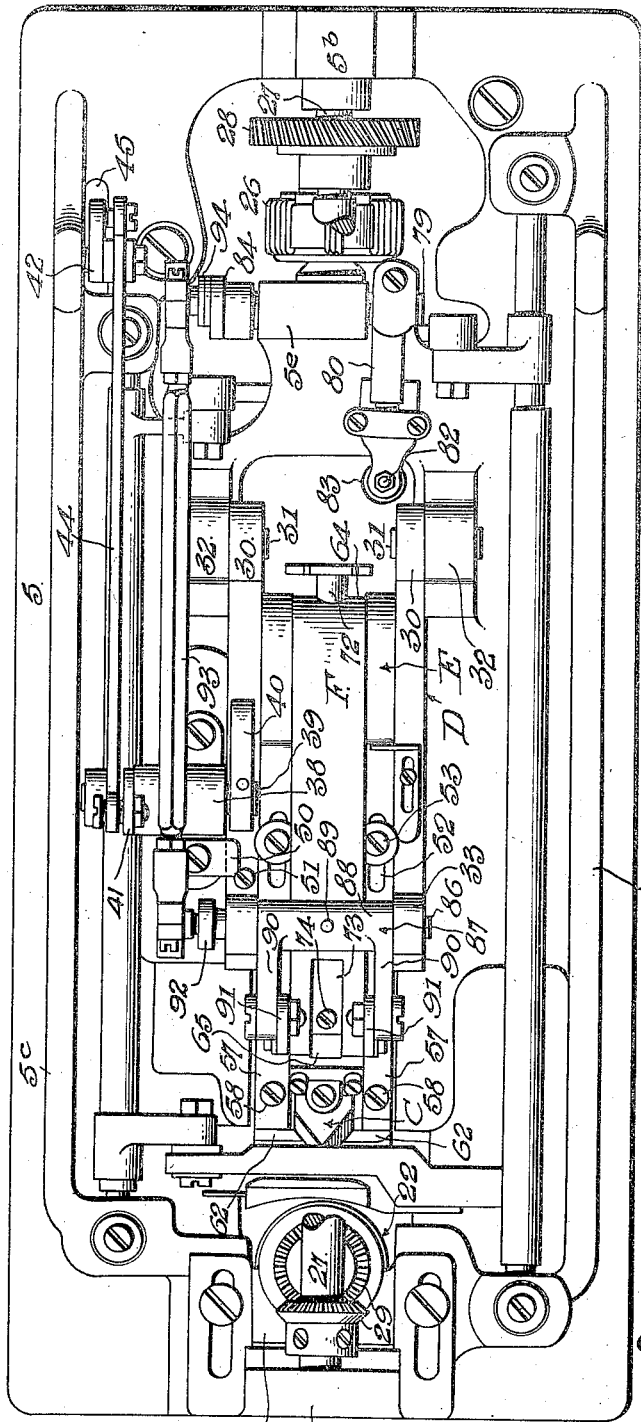

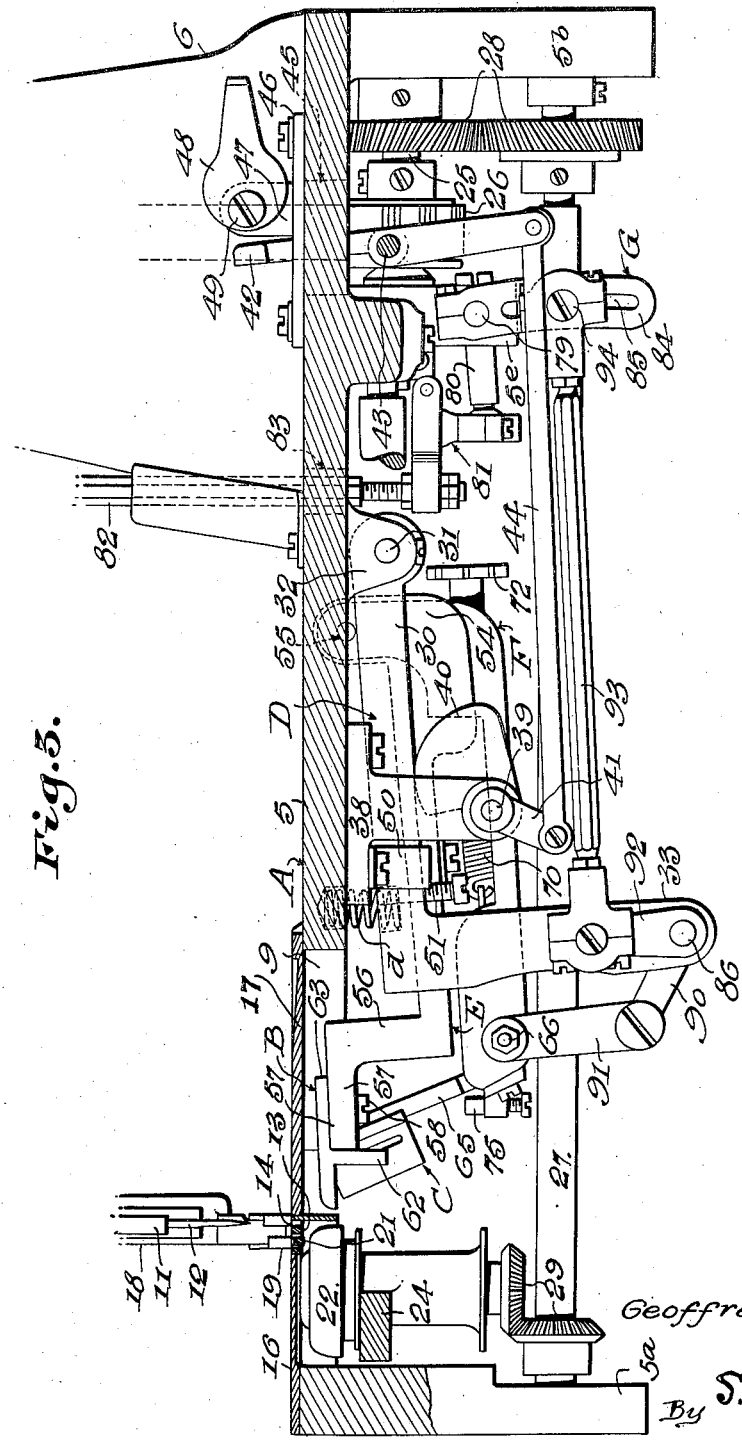

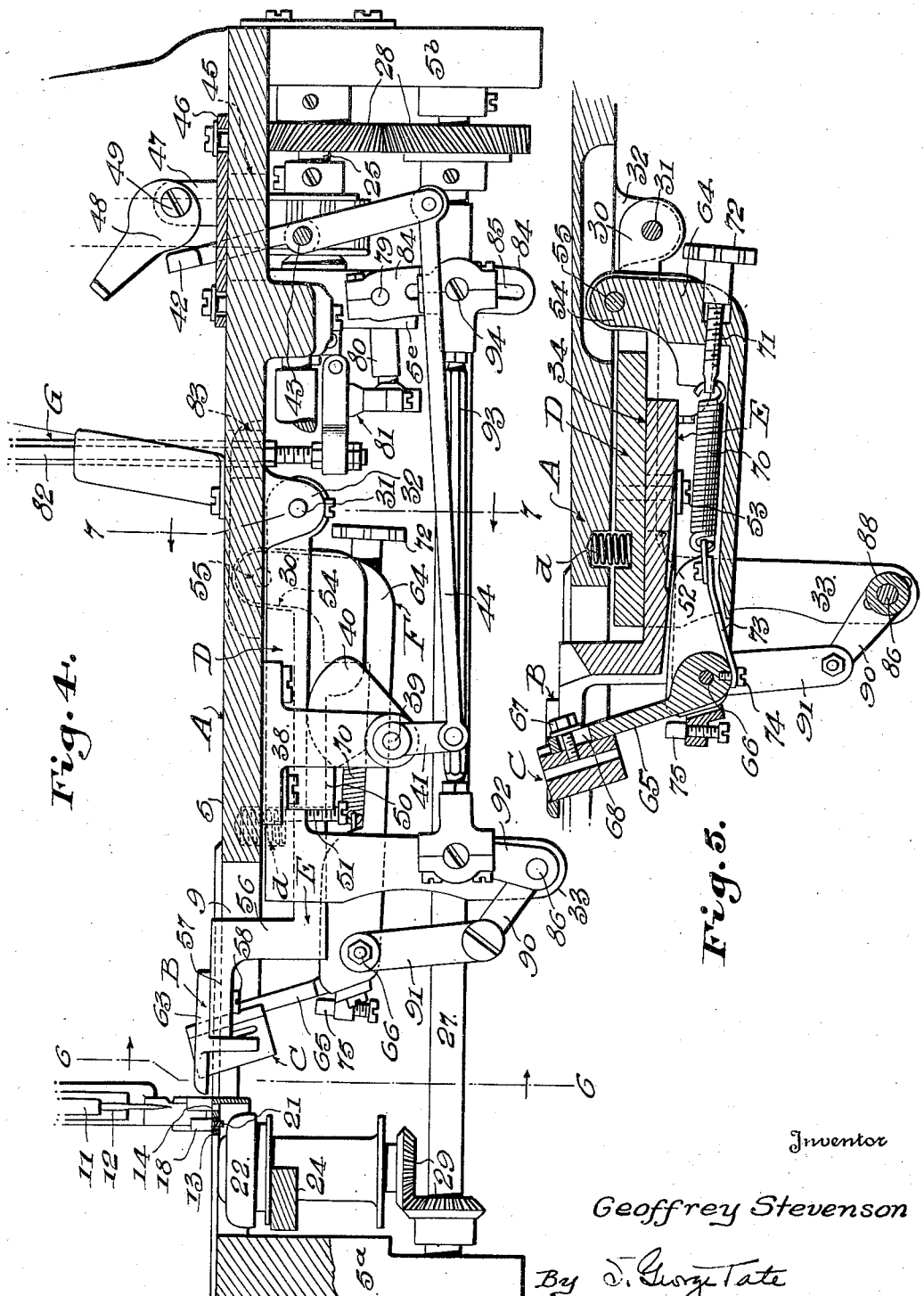

July 11, 1939.   G. STEVENSON   2,165,313
TRIMMING MECHANISM
Original Filed May 14, 1937   7 Sheets-Sheet 5

Inventor
Geoffrey Stevenson
By J. George Tate
Attorney

July 11, 1939.  G. STEVENSON  2,165,313
TRIMMING MECHANISM
Original Filed May 14, 1937  7 Sheets-Sheet 6

Inventor
Geoffrey Stevenson
By E. S. George Tate
Attorney

July 11, 1939.	G. STEVENSON	2,165,313
TRIMMING MECHANISM
Original Filed May 14, 1937	7 Sheets-Sheet 7
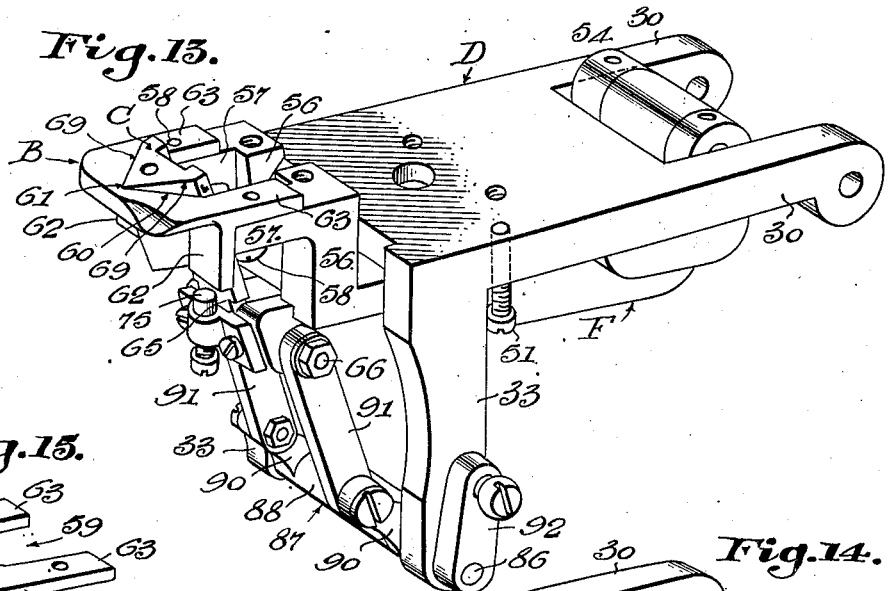
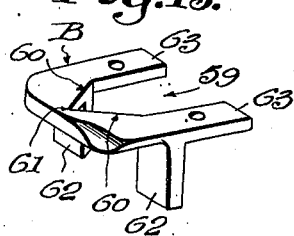
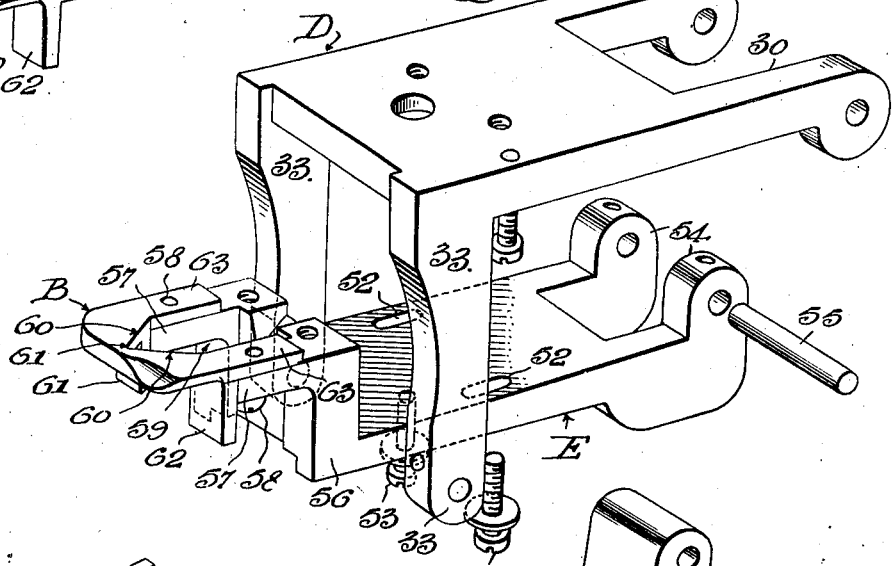
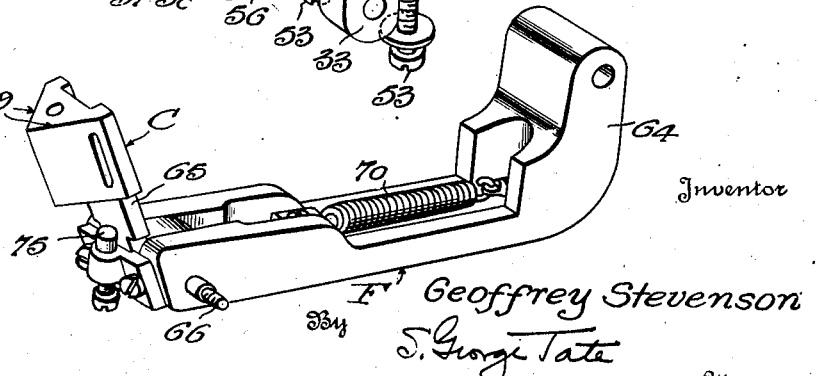
Inventor
Geoffrey Stevenson
By S. George Tate
Attorney Patented July 11, 1939

2,165,313

UNITED STATES PATENT OFFICE 2,165,313

TRIMMING MECHANISM

Geoffrey Stevenson, Brookline, Mass.

Original application May 14, 1937, Serial No. 142,696. Divided and this application October 25, 1937, Serial No. 170,913

58 Claims. (Cl. 164—17.5)

This invention relates to new and useful improvements in trimming mechanisms generally, although more particularly to a trimming mechanism adapted for use in sewing machines for trimming or pinking an edge or the edges of superposed fabrics prior to the seaming operation.

This application constitutes a division of my parent application Serial No. 142,696, filed May 14, 1937 for improvements in Combined seaming and pinking machines.

The principal object of the invention is to provide an edge trimming mechanism which is normally positioned for cooperation with the stitching mechanism to trim the work above the base or work plate and in timed relation to the needle reciprocations, and which is depressible so as to leave the upper face of the base unobstructed for the free passage of work during plain seaming operations.

With the above and other objects in view which will more fully appear, the nature of the invention will be more clearly understood by following the description, the appended claims, and the several views illustrated in the accompanying drawings.

Figure 7:
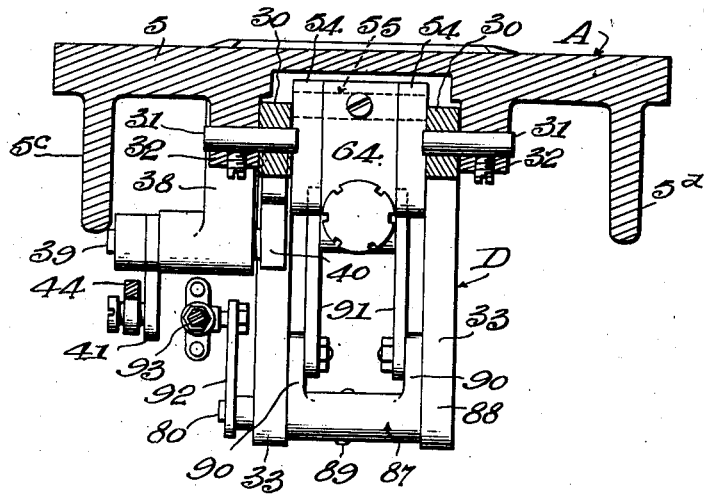
Figure 8:
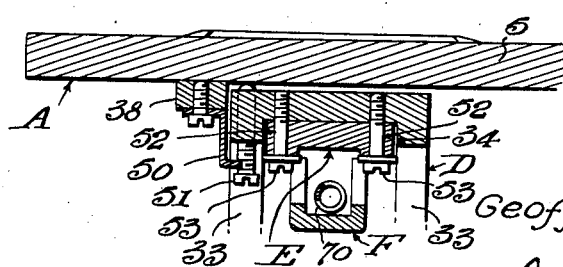
Figure 9:
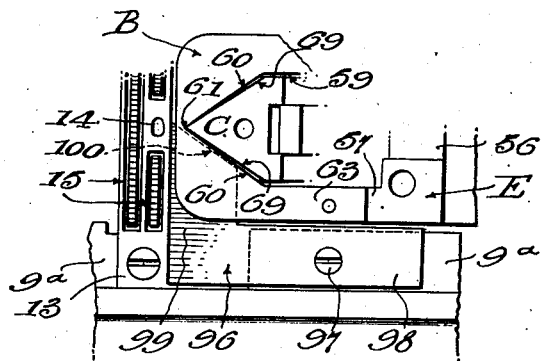
Figure 10:
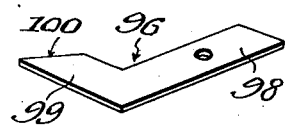

In the drawings:

Figure 1 is a front elevation of a sewing machine embodying my invention, the pinking unit being depressed below the bed plate, Figure 2 is a bottom plan view thereof, Figure 3 is an enlarged vertical longitudinal sectional view through the bed plate showing the pinking unit in its depressed position, Figure 4 is a similar view but showing the pinking unit in its elevated or working position, Figure 5 is a vertical longitudinal section taken through the bed plate and the pinking unit, Figure 6 is a vertical cross section taken on the line 6—6 of Figure 4, Figure 7 is a vertical cross section taken on the line 7—7 of Figure 4, Figure 8 is a detail vertical cross section showing the stops for limiting the upper and lower positions of the pinking unit, Figure 9 is a detail plan view showing the pinking unit in its elevated position, together with a plate which covers the opening immediately in front of the unit, Figure 10 is a perspective view of the filler plate shown in Figure 9.

Figure 11:
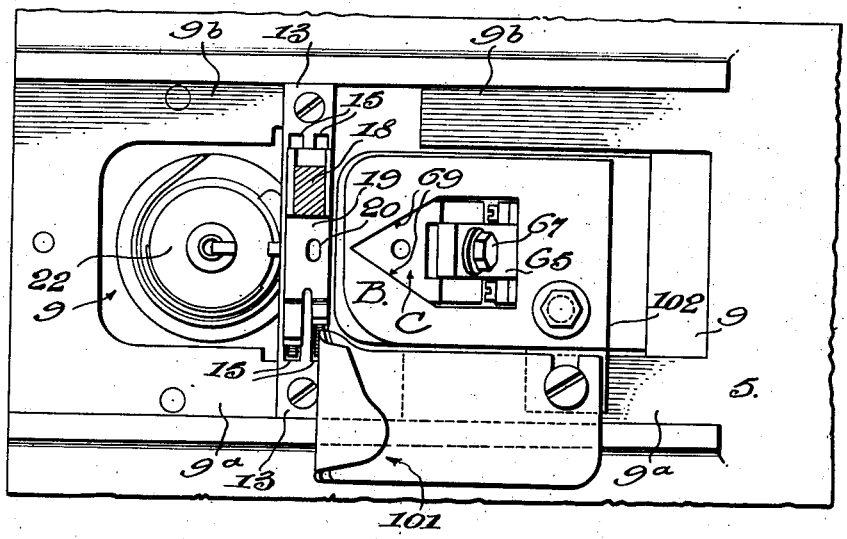
Figure 12:
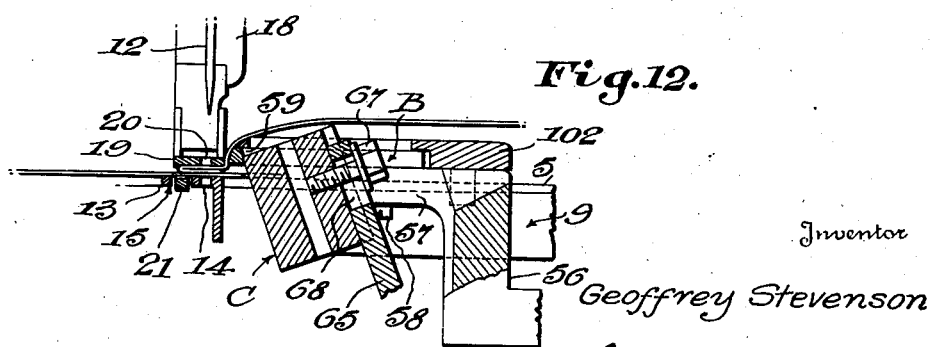

Figure 11 is a plan view of the trimmer unit showing a separating plate and a hemmer attached, Figure 12 is a central vertical longitudinal section thereof, Figure 13 is a perspective view of the pinking unit, Figure 14 is a perspective view showing the supporting lever and the ledger blade holder in separated relation, Figure 15 is a perspective view of the upper cutting element, and Figure 16 is a perspective view of the knife lever and the knife mounted thereon.

Like reference numerals designate corresponding parts throughout the several figures of the drawings.

Referring to the drawings, my invention is preferably applied to a sewing machine which embodies a main frame A having a base or bed plate 5, a standard 6, a horizontal arm 7 which projects from the upper end of the standard and extends longitudinally over the base, and a stitching head 8 which is mounted on the free end of the arm 7, said base being provided with a longitudinal opening 9 under said head. The base 5 is provided at its ends with integral and depending bearing arms $5^a$, $5^b$, and with integral and depending front and rear longitudinally extending walls $5^c$, $5^d$, as well as an integral and depending bearing arm $5^e$ which is spaced from the bearing arm $5^b$. The upper surface of the base 5 is milled along the sides of the opening 9 to form resultant front and rear depressed seats $9^a$, $9^b$. A main shaft 10 extends longitudinally of and is journaled in the arm 7. A vertically reciprocatory needle bar 11 carrying a needle 12, is mounted in the head 8 and is driven from the main shaft by the usual connections which reciprocate the needle once for every rotation of the main shaft. A throat plate 13 which is supported by the seats $9^a$, $9^b$ of the base and extends centrally across the opening 9, is provided with a needle opening 14 adjacent the right hand edge thereof and with feed slots 15 (see Fig. 9). The portions of the opening 9 on opposite sides of the throat plate are adapted to be closed by removable cover plates 16 and 17 respectively which are slidably mounted on the seats $9^a$, $9^b$. A presser bar 18 is mounted in the head 8 and fixed to the lower end thereof is a presser foot 19 which is positioned directly above the throat plate 13 and is provided with a needle opening 20. An intermittent 4-motion feed dog 21 is positioned in the feed slots 15 of the throat plate for cooperation with the presser foot to feed the work rearwardly and is operated from the main shaft in the usual manner. Cooperating with the needle to form stitches is a rotary loop taker or hook 22 which is located below the cover plate 16 and on the left hand side of the needle. This hook is mounted on a vertical shaft 23 which is journaled in a bracket 24 attached to the base. A horizontal shaft 25 is journaled in the bearing arms 5b and 5e below the base 5 and the standard 6 and is driven at a 2-to-1 ratio from the main shaft 10 by a belt 26. The vertical shaft 23 is driven from the shaft 25 through the medium of a horizontal shaft 27 which is journaled in the depending bearing arms 5a, 5b, and 1-to-1 gear couplings 28 and 29, the shaft 27 being located below the needle and in spaced relation to the base. It will be noted that the shaft 27 extends longitudinally of the base and is disposed in the vertical plane containing the needle.

A trimming mechanism is disposed on the right hand side of the needle, i. e., on the side of the needle opposite the rotary loop taker. This trimming mechanism includes an upper cutting element or ledger blade B and a cooperating lower cutting element or knife C. The upper element B is separate from the presser foot 19, and when said element B is in its effective or cutting position, it is disposed above the plane of the base 5. Both cutting elements B and C are mounted on a support D which is located below the base, the elements and the support being adjustable longitudinally of the base as a unit by slots 52 whereby the distance between the line of seam of the fabrics and the trimmed edge thereof may be varied. Furthermore, both elements are movable upwardly as a unit through the opening 9 of the base to an effective or operating position, or downwardly as a unit through said openings to an ineffective or inoperative position below the base 5.

The support D is in the form of a lever having spaced longitudinal arms 30, 30 which extend from its right hand end and are fulcrumed as at 31, 31 on lugs 32, 32 projecting downwardly from the base, the lever thus being fulcrumed on a horizontal axis which is parallel to the line of feed and is located below the base opening 9 and the standard 6. Rigidly connected to and depending from the free end of the supporting lever D are spaced hanger arms 33, 33 and the under face of the supporting lever is provided with a central longitudinal groove 34.

A coil spring $d$ is interposed between the base 5 and the supporting lever and functions to urge the lever downwardly, the upper and lower ends of the spring being positioned in seats respectively formed in the under face of the base and in the upper face of the lever.

A manually operable means for elevating the support D includes a bracket 38 which is attached to the under face of the base 5 in front of and intermediate the ends of the support. A horizontal cam shaft 39 is journaled in the bracket and fixed to said shaft is a cam 40 which engages the under face of the supporting lever D directly in front of the groove 34 therein. The cam shaft 39 is provided with a depending crank arm 41. A vertically disposed lever 42 is fulcrumed intermediate its ends as at 43 to the front wall 5c of the base 5. The lower arm of this lever is connected by a link 44 to the crank arm 41, and the upper arm of said lever projects through a longitudinally extending opening 45 formed in the base 5. A bracket 46 is mounted on the upper face of the base 5 and includes a post 47 which is disposed on the right hand side of the upper arm of said lever. A manually operable eccentric 48 is fulcrumed as at 49 on said post for engaging the upper arm of the lever and effecting the rocking movement of the cam to raise the support D against the tension of the spring $d$. A stop 50 is attached to the bracket 38 and functions to limit the downward movement of the support D when the cam 40 is moved in the opposite direction. A stop screw 51 is threadably engaged in the support D for cooperation with the under face of the base 5 to variably limit the upward movement of said support.

Mounted in the groove 34 of the supporting lever D for adjustments towards and from the needle 12, is a holder E for the upper cutting element B, the holder being provided with longitudinal slots 52, 52 through which clamping screws 53 pass into the lever D. The holder E is thus normally clamped to and supported by the lever D and is consequently movable up and down therewith, but can be adjusted longitudinally of the base when so desired. The right hand end of the holder is provided with spaced and upwardly projecting arms 54, 54 which project between the arms 30, 30 of the supporting lever D and support a horizontal pivot pin 55. Rigidly connected to the left hand end of the holder and disposed in registry with the base opening 9 at the right of the throat plate is a neck 56 which terminates at its upper end in spaced horizontal arms 57, 57 which project towards the needle, and the upper cutting element or ledger blade B is rigidly mounted on said arms by screws 58, 58.

The upper cutting element or ledger blade B is provided with a V-shaped opening 59 forming resultant cutting edges 60, 60 which converge toward the needle 12 and merge at the apex 61 at an angle of less than 90°; and with depending guide lugs 62, 62 to prevent the escape of the lower cutting element or knife C from registering relation with the ledger blade in the most open working position of the knife, as well as to serve as a gage for the material. The blade B is also provided with spaced attaching arms 63, 63 which rest upon the spaced supporting arms 57, 57 and are secured thereto by the screws 58.

A lever F which supports the lower cutting element or knife C is mounted for vertical reciprocations on the support D through the medium of the holder E. This knife lever F is located under the holder E and is provided at the end opposite the knife C with an upwardly projecting rigid arm 64 which is fulcrumed on the horizontal pivot pin 55 of the ledger blade holder E. A knife arm 65 is pivoted at its lower end to swing about a horizontal pivot 66 mounted in the free end of the lever F, and the upper end of the arm projects upwardly towards the opening of the ledger blade B. The knife C is mounted on the arm 65 for vertical adjustments by means of a clamping screw 67 carried by the knife and a slot 68 formed in the arm. The knife C is V-shaped in cross section forming converging cutting edges 69, 69 which enter into and cooperate with the cutting edges 60, 60 of the ledger blade to perform the pinking operation. The knife C is presented at an inclination to the ledger blade and the plane of the cutting edges 69, 69 is oblique to the longitudinal axis of the knife so that the rear corners of the knife are in advance of the apex during the cutting operation, with the result that the two pairs of cooperating cutting edges have point contact which advances toward the apex as the cutting progresses by the entry of the knife C into the ledger blade B, the cutting terminating when the two apices coincide. The knife C yields about the pivot 66 during the cutting operation, the edges 69, 69 crossing the cooperating edges of the ledger blade but the angle of the faces of the knife C being less in the plane of the ledger blade than that of the ledger blade opening whereby the knife C may enter into the ledger blade. This angular relation between the cutting edges of the ledger blade and the cutting edges of the knife is disclosed and claimed in the patent to Gruman 1,891,308, December 20, 1932. The cutting edges of the knife are maintained in yieldable engagement with the cutting edges of the ledger blade during cutting movements of the knife, by means of a coil spring 70 which is adjustably anchored at one end to the arm 64 of the knife lever F by an adjustable screw 71 and nut 72, and by a link 73 which is connected at one end to the other end of the spring, and at its other end to the lower end of the knife arm 65 below the pivot 66 thereof by a screw 74. A manually operable cam 75 is mounted on the lever F for cooperation with the knife arm 65 to positively retract and retain the knife C from contact with the ledger blade B whenever it is desired to change the knife.

The knife C is adapted to be reciprocated from the main shaft 10 in timed relation to the needle reciprocations by a driving mechanism G which includes a manually selective means for effecting the formation of either a greater or a lesser number of stitches to each pink cut by the knife C, or for silencing the knife. A bearing bracket 76 is attached to the under face of the horizontal frame arm 7, and journaled in this bracket is a longitudinally extending counter or driven shaft 77 which parallels the main shaft 10, the left hand end of the shaft projecting beyond the bracket 76. A ball eccentric 78 is fixed to a stop collar which is secured to the right hand end of the counter shaft 77. A transversely disposed rock shaft 79 is journaled in the depending bearing arm 5$^e$ of the base, and the rear end thereof is provided with a horizontally extending rock arm 80 which is pivotally connected as at 81 to the lower end of a vertical link or pitman 82 which extends upwardly through an opening 83 in the base and has its upper end connected to the ball eccentric 78 on the counter shaft. Fixed to the front end of the rock shaft 79 is a depending rock arm 84 having a segmental slot 85 extending longitudinally thereof. A horizontal rock shaft 86 is journaled in the lower ends of the depending arms 33, 33 of the supporting lever D, and a rocking frame 87 is journaled on said shaft intermediate said arms. The rocking frame 87 comprises a hub 88 which surrounds the shaft and is rigidly connected thereto by a transverse pin 89, together with spaced rock arms 90, 90 which are integral with the hub and project upwardly at an inclination towards the free end of the knife supporting lever F, the arms being pivotally connected to said free end of the lever D by links 91, 91. Fixed to the front end of the rock shaft 86 is an upstanding rock arm 92 which is pivotally connected to one end of a link 93, the other end of the link having an adjustable connection 94 with the rock arm 84 and the segmental slot 85 therein, whereby the vertical stroke of the knife C may be varied.

The counter shaft 77 is rotated from the main shaft 10 through the medium of a selective gear coupling which is indicated generally at 95 and is fully described in my parent application.

When the upper cutting element or ledger blade B is in its elevated or operative position as shown in Fig. 4, it is in a horizontal plane spaced above the upper surface of the base 5 for permitting both edge portions of superposed fabrics or the edge portion of the lower fabric to be fed thereunder and pinked. In order to support this edge portion or portions against sagging into the opening 9 of the base 5 immediately in front of the lower cutting element C, I have provided an L-shaped filler plate 96 (Figs. 9 and 10) which is attached, subsequently to the cutting elements being elevated, to the front seat 9$^a$ of the base 5 by a screw 97. This plate 96 comprises an attaching arm 98 and a rearwardly projecting arm 99 having a beveled rear end 100 which parallels but is spaced from the adjacent cutting edge 69 of the knife C.

In certain operations, I employ a folder 101 which is attached to a separating plate 102, the latter being mounted on the arms 57 of the holder E. The separating plate serves to maintain the edge portion of the upper fabric separated from the movable knife C, and also constitutes a solid backing for the ledger blade B to maintain the latter against being moved upwardly by the thrust of the knife C. It will be obvious that the separating plate equipment has utility in a pinking mechanism per se, and independently of any stitch forming mechanism, since it is possible to form a seam such as is shown in Figure 12 of the drawings on a sewing machine and then put it through the pinking mechanism per se claimed herein.

It is of course to be understood that the details of structure and arrangement of parts may be variously changed and modified without departing from the spirit and scope of my invention.

I claim:

1. A pinking mechanism for sewing machines having a horizontal base, comprising a stationary horizontally disposed ledger blade having a cutting opening therein, and a cooperating vertically reciprocatory knife supported below the base and operable in said opening.

2. A pinking mechanism for sewing machines having a horizontal base, comprising a stationary horizontally disposed ledger blade having a cutting opening therein, a lever fulcrumed on the base and having one end positioned for vertical reciprocations below the base and operable in said opening, and a knife mounted on said end of the lever for cooperation with the opening in the ledger blade.

3. A pinking mechanism for sewing machines having a base, comprising a ledger blade disposed in the general plane of the base and having a V-shaped opening therein, a cooperating vertically reciprocatory V-shaped knife supported below the base and operable in said opening, and means for maintaining the V of the blade opening and the V of the knife in yieldable engagement during cutting movements of the knife.

4. A pinking mechanism for sewing machines having a base, comprising a ledger blade disposed in the general plane of the base and having a V-shaped opening therein, a cooperating vertically reciprocatory V-shaped knife supported below the base and operable in said opening, and means engaging the knife for maintaining the V of the knife in yieldable engagement with the V of the blade opening during cutting movements of the knife.

5. A trimming mechanism for sewing machines having a base, comprising a ledger blade spaced above the base, a lever pivoted below the base for oscillations about a horizontal axis, a knife pivotally mounted on the lever for cooperation with the ledger blade, and means cooperating with the knife and lever for maintaining the knife in yieldable engagement with the ledger blade during cutting movements of the knife.

6. A pinking mechanism for sewing machines having a base, comprising a stationary ledger blade disposed in the general plane of the base and having a V-shaped opening therein, a lever pivoted below the base for oscillations about a horizontal axis, a V-shaped knife mounted on said lever for cooperation with the opening in the ledger blade, and means for reciprocating said knife including a bell crank lever mounted below the lever and having one end pivotally connected to said lever.

7. A pinking mechanism for sewing machines having a base, comprising a ledger blade having a V-shaped opening therein and disposed in a plane parallel with and spaced above the base, a supporting element for the ledger blade mounted below and projecting upwardly through the base, and a cooperating V-shaped cutting element supported below the base and operable in said opening.

8. A pinking mechanism for sewing machines having a base, comprising a stationary ledger blade having a V-shaped opening therein and disposed in a plane parallel with and spaced above the base, and a vertically reciprocatory V-shaped knife supported below the base and provided with a cutting edge on its upper end for cooperation with the opening in the ledger blade during the upstroke of the knife.

9. A pinking mechanism for sewing machines having a base, comprising cooperating cutting elements, one said element being disposed horizontally and having a cutting opening therein and the other said element being supported below the base and operable in said opening, and means for effecting a depression of said cutting elements to an ineffective cutting position below the base.

10. A pinking mechanism for sewing machines having a base, comprising upper and lower cooperating cutting elements, the upper element being disposed above the base and the lower element being supported below the base, and means for effecting a depression of said cutting elements below the upper face of the base to an ineffective cutting position.

11. A trimming mechanism for sewing machines having a base, comprising upper and lower cooperating cutting elements, the upper element being disposed above the base and the lower element being supported below the base, and means including a manually operable lever for effecting a depression of said cutting elements as a unit to an ineffective cutting position below the base.

12. A trimming mechanism for sewing machines having a base, comprising upper and lower cooperating cutting elements, the upper element being disposed above the base and the lower element being supported below the base, and means for effecting a depression of said cutting elements as a unit below the upper face of the base to an ineffective cutting position.

13. A trimming mechanism for sewing machines having a base, comprising a vertically reciprocatory support mounted below the base and having a portion projecting upwardly therethrough, a ledger blade mounted on the projecting portion of the support and spaced above the base, a cooperating vertically reciprocatory knife mounted below the base, and means for effecting a depression of said ledger blade and knife to an ineffective cutting position below the base.

14. A trimming mechanism for sewing machines having a base, comprising upper and lower cooperating cutting elements, the upper element being disposed above the base and the lower element being supported below the base, and manually operable means for normally retaining the cutting elements in effective cutting position and for effecting a depression of said elements to an ineffective cutting position below the base upon release of said retaining means.

15. A trimming mechanism for sewing machines having a base, comprising upper and lower cooperating cutting elements, the upper element being disposed above the base and the lower element being supported below the base, and manually operable means including a cam for normally retaining the cutting elements in effective cutting position and for effecting a depression of said elements to an ineffective cutting position below the base upon release of said retaining means.

16. A trimming mechanism for sewing machines having a base, comprising upper and lower cooperating cutting elements, the upper element being disposed above the base and the lower element being supported below the base, and manually operable means including a cam for normally retaining the cutting elements in effective cutting position, and a spring for depressing said elements to an ineffective cutting position below the base upon release of said retaining means.

17. A trimming mechanism for sewing machines comprising a base having an opening, a support mounted below the base to oscillate about a horizontal axis, a ledger blade spaced above the opening and mounted on the support, manually operable means for normally retaining the support against swinging movement, a knife mounted below the base to swing about a horizontal axis, a knife mounted on said lever and projecting upwardly through said opening for cooperation with said ledger blade, and means for oscillating said knife lever, said support upon release of said retaining means moving to a position wherein said ledger blade and said knife will be in an ineffective cutting position below the base.

18. A trimming mechanism for sewing machines comprising a base having an opening, a support mounted below the base to oscillate about a horizontal axis, a holder mounted on said support and having an end projecting upwardly through said opening, a ledger blade spaced above the opening and mounted on the projecting end of the support, manually operable means for normally retaining the support and holder against swinging movement, a knife lever located below the holder and fulcrumed thereon to swing about a horizontal axis, a knife mounted on said lever and projecting upwardly through said opening for cooperation with said ledger blade, and means for oscillating said knife lever including a bell crank lever and a link interposed between the holder and the lever, said support upon release of said retaining means moving to a position wherein said ledger blade and said knife will be in an ineffective cutting position below the base.

19. A trimming mechanism for sewing machines comprising a base having an opening, a support mounted below the base to oscillate about a horizontal axis, a ledger blade spaced above the opening and mounted on the support, means for retaining the support against swinging movement, a knife lever mounted on the support below the base to swing about a horizontal axis, a knife mounted on said lever and projecting upwardly through said opening for cooperation with said ledger blade, and means for oscillating said knife lever.

20. A trimming mechanism for sewing machines comprising a base having an opening, a support mounted below the base to oscillate about a horizontal axis, a holder mounted on said support and having an end projecting upwardly through said opening, a ledger blade spaced above the opening and mounted on the projecting end of the support, means for retaining the support against swinging movement, a knife lever located below the holder and fulcrumed thereon to swing about a horizontal axis, a knife mounted on said lever and projecting upwardly through said opening for cooperation with said ledger blade, and means for oscillating said knife lever including a bell crank lever and a link interposed between the holder and the lever.

21. A pinking mechanism for sewing machines having a base, comprising a ledger blade spaced above the base and provided with an opening forming converging cutting edges, and a vertically reciprocatory knife supported below the base and having converging cutting edges for cooperation with the cutting edges of the ledger blade.

22. A pinking mechanism for sewing machines having a base, comprising a ledger blade spaced above the base and provided with an opening forming converging cutting edges, and a verticaly reciprocatory knife supported below the base and having converging cutting edges for cooperation with the cutting edges of the ledger blade, the angle of the cutting edges of the ledger blade being more than the angle of the cutting edges of the knife.

23. A pinking mechanism for sewing machines having a base, comprising a ledger blade spaced above the base and provided with an opening forming converging cutting edges, a vertically reciprocatory knife supported below the base and having converging cutting edges for cooperation with the cutting edges of the ledger blade, and means for maintaining the cutting edges of the blade and knife in yieldable engagement with each other during cutting movements of the knife.

24. A pinking mechanism for sewing machines having a base, comprising a stationary ledger blade spaced above the base and provided with an opening forming converging cutting edges, a vertically reciprocatory knife supported below the base and having converging cutting edges for cooperation with the cutting edges of the ledger blade, and means cooperating with the knife for maintaining the cutting edges of the blade and knife in yieldable engagement with each other during cutting movements of the knife.

25. A pinking mechanism for sewing machines having a base, comprising a stationary ledger blade spaced above the base and provided with an opening forming converging cutting edges, a vertically reciprocatory knife supported below the base and having converging cutting edges for cooperation with the cutting edges of the ledger blade, the angle of the cutting edges of the ledger blade being more than the angle of the cutting edges of the knife, and means for maintaining the cutting edges of the blade and knife in yieldable engagement with each other during cutting movements of the knife.

26. A pinking mechanism for sewing machines having a base, comprising a stationary ledger blade spaced above the base and provided with an opening forming converging cutting edges, a vertically reciprocatory knife supported below the base and having converging cutting edges for cooperation with the cutting edges of the ledger blade, the angle of the cutting edges of the ledger blade being more than the angle of the cutting edges of the knife, and means cooperating with the knife for maintaining the cutting edges of the blade and knife in yieldable engagement with each other during cutting movements of the knife.

27. A pinking mechanism for sewing machines having a base, comprising a ledger blade spaced above the base and provided with an opening forming converging cutting edges, a lever pivoted below the base for oscillations about a horizontal axis, and a knife mounted on said lever and having converging cutting edges for cooperation with the cutting edges of the ledger blade.

28. A pinking mechanism for sewing machines having a base comprising a ledger blade spaced above the base and provided with an opening forming converging cutting edges, a lever pivoted below the base for oscillations about a horizontal axis, a knife mounted on said lever and having converging cutting edges for cooperation with the cutting edges of the ledger blade, and means including lever and link connections for reciprocating said knife.

29. A pinking mechanism for sewing machines having a base, comprising a stationary ledger blade spaced above the base and provided with an opening forming converging cutting edges, and a vertically reciprocatory knife supported below the base and provided with converging cutting edges on its upper end for cooperation with the cutting edges of the ledger blade during the upstroke of the knife.

30. A pinking mechanism for sewing machines having a base, comprising a ledger blade spaced above the base and provided with an opening forming converging cutting edges, and a vertically reciprocatory knife supported below the base and having converging cutting edges for cooperation with the cutting edges of the ledger blade, and means for depressing said ledger blade and said knife to an ineffective cutting position.

31. A pinking mechanism for sewing machines having a base, comprising a ledger blade spaced above the base and provided with an opening forming converging cutting edges, and a vertically reciprocatory knife supported below the base and having converging cutting edges for cooperation with the cutting edges of the ledger blade, manually operable means for normally retaining the ledger blade and the knife in effective cutting position, and means for depressing said blade and knife to an ineffective cutting position upon release of said retaining means.

32. A pinking mechanism for sewing machines comprising a base having an opening, a support mounted below the base to oscillate about a horizontal axis, a ledger blade spaced above the opening and mounted on the support, said ledger blade being provided with an opening forming converging cutting edges, means for retaining the support against swinging movement, a knife lever mounted on the support below the base to swing about a horizontal axis, a knife mounted on said lever and projecting upwardly through said opening for cooperation with the cutting edges of said ledger blade, and means for oscillating said knife lever.

33. A pinking mechanism for sewing machines comprising a base having an opening, a support mounted below the base to oscillate about a horizontal axis, a holder mounted on said support and having an end projecting upwardly through said opening, a ledger blade spaced above the opening and mounted on the projecting end of the support, said ledger blade having an opening forming converging cutting edges, means for retaining the support against swinging movement, a knife lever located below the holder and fulcrumed thereon to swing about a horizontal axis, a knife mounted on said lever and projecting upwardly through said opening for cooperation with the cutting edges of said ledger blade, and means for oscillating said knife lever.

34. A pinking mechanism for sewing machines comprising a base having an opening, a support mounted below the base to oscillate about a horizontal axis, a ledger blade spaced above the opening and mounted on the support, said ledger blade being provided with an opening forming converging cutting edges, means for retaining the support against swinging movement, a knife lever mounted on the support below the base to swing about a horizontal axis, a knife mounted on said lever and projecting upwardly through said opening for cooperation with the cutting edges of said ledger blade, and means for oscillating said knife lever, and means for effecting a depression of the ledger blade and the knife lever upon release of said retaining means to an ineffective cutting position below the base.

35. A pinking mechanism for sewing machines having a base, comprising a ledger blade spaced above the base and provided with an opening forming converging cutting edges, a vertically reciprocatory knife supported below the base and having converging cutting edges for cooperation with the cutting edges of the ledger blade, and a separating and ledger blade backing plate positioned above the ledger blade.

36. A pinking mechanism for sewing machines having a base, comprising a ledger blade spaced above the base and provided with an opening forming converging cutting edges, a vertically reciprocatory knife supported below the base and having converging cutting edges for cooperation with the cutting edges of the ledger blade, and a separating and ledger blade backing plate positioned above the ledger plate and provided with an opening for receiving the upper end of the knife.

37. A pinking mechanism for sewing machines having a base, comprising a ledger blade spaced above the base and provided with an opening forming converging cutting edges, a vertically reciprocatory knife supported below the base and having converging cutting edges for cooperation with the cutting edges of the ledger blade, the angle of the cutting edges of the ledger blade being more than the angle of the cutting edges of the knife, and a separating and ledger blade backing plate positioned above the ledger blade and provided with an opening for receiving the upper end of the knife.

38. A pinking mechanism for sewing machines having a base, comprising a ledger blade spaced above the base and provided with an opening forming converging cutting edges, a vertically reciprocatory knife supported below the base and having converging cutting edges for cooperation with the cutting edges of the ledger blade, means for maintaining the cutting edges of the blade and knife in yieldable engagement with each other during cutting movements of the knife, and a separating and ledger blade backing plate positioned above the ledger blade.

39. A pinking mechanism for sewing machines having a base, comprising a stationary ledger blade spaced above the base and provided with an opening forming converging cutting edges, a vertically reciprocatory knife supported below the base and having converging cutting edges for cooperation with the cutting edges of the ledger blade, the angle of the cutting edges of the ledger blade being more than the angle of the cutting edges of the knife, means cooperating with the knife for maintaining the cutting edges of the blade and knife in yieldable engagement with each other during cutting movements of the knife, and a separating and ledger blade backing plate positioned above the ledger blade.

40. A pinking mechanism for sewing machines having a base, comprising a stationary ledger blade spaced above the base and provided with an opening forming converging cutting edges, a vertically reciprocatory knife supported below the base and having converging cutting edges for cooperation with the cutting edges of the ledger blade, the angle of the cutting edges of the ledger blade being more than the angle of the cutting edges of the knife, means cooperating with the knife for maintaining the cutting edges of the blade and knife in yieldable engagement with each other during cutting movements of the knife, and a separating and ledger blade backing plate positioned above the ledger blade and provided with an opening for receiving the upper end of the knife.

41. A trimming mechanism for sewing machines having a base, comprising upper and lower cooperating cutting elements normally disposed in ineffective cutting position below the base, and manually operable means for raising said cutting elements to effective cutting position wherein the upper cutting element is disposed above the base, or for effecting the depression of said cutting elements to their normal position below the base.

42. A trimming mechanism for sewing machines having a base, comprising upper and lower cooperating cutting elements normally disposed in ineffective cutting position below the base, and manually operable means for raising said cutting elements as a unit to effective cutting position wherein the upper cutting element is disposed above the base, or for effecting the depression of said cutting elements to their normal position below the base.

43. A pinking mechanism for sewing machines comprising a base having an opening, a support mounted below the base, a ledger blade spaced above the opening and mounted on the support, said ledger blade being provided with an opening forming converging cutting edges, a knife lever mounted on the support below the base to swing about a horizontal axis, a knife mounted on said lever and projecting upwardly through said opening for cooperation with the cutting edges of said ledger blade, means for oscillating said knife lever, and a backing plate for the ledger blade mounted on said support for retaining the said blade against being moved by the thrust of the knife.

44. A pinking mechanism for a sewing machine having a base and adapted to be mounted below the base of the sewing machine, which pinking mechanism comprises cooperating, relatively reciprocatory, pinking knives conjointly operative to effect a cut in a substantially horizontal plane when mounted on a sewing machine, and means disposed below the cutting plane of the knives for effecting relative reciprocatory movement of the pinking knives.

45. A pinking mechanism for a sewing machine having a base and adapted to be mounted below the base of the sewing machine, which pinking mechanism comprises relatively reciprocatory, pinking knives conjointly operative to effect a cut in a substantially horizontal plane when mounted on a sewing machine, means disposed below the cutting plane of the knives for effecting relative reciprocatory movement of the pinking knives, and means for positioning the pinking mechanism below the base of a sewing machine with one of said pinking knives disposed above the base of the sewing machine.

46. A pinking mechanism for a sewing machine having a base and adapted to be mounted below the base of the sewing machine, which pinking mechanism comprises cooperating, relatively reciprocatory, pinking knives having converging cutting edges conjointly operative when mounted on a sewing machine to effect a V-shaped cut in a substantially horizontal plane, and means disposed below the cutting plane of the knives for effecting relative reciprocatory movement of the knives.

47. A pinking mechanism for a sewing machine having a base and adapted to be mounted below the base of the sewing machine, which pinking mechanism comprises cooperating, relatively reciprocatory, pinking knives having converging cutting edges conjointly operable when mounted on a sewing machine to effect a V-shaped cut in a substantially horizontal plane, a lever for effecting relative, reciprocatory movement of the knives pivotally mounted below the cutting plane of the knives for oscillation about an axis substantially parallel to the cutting plane of the knives, and means for maintaining the knives in yieldable engagement during cutting movement of the knives.

48. A pinking mechanism for a sewing machine having a base and adapted to be mounted below the base of a sewing machine, which pinking mechanism comprises cooperating, relatively reciprocatory, pinking knives having converging cutting edges conjointly operable when mounted on a sewing machine to effect a V-shaped cut in a substantially horizontal plane, a lever for effecting relative, reciprocatory movement of the knives pivotally mounted below the cutting plane of the knives for oscillation about an axis substantially parallel to the cutting plane of the knives, and means cooperating with the lever and one of the knives for maintaining the knives in yieldable engagement during cutting movement of the knives.

49. A pinking mechanism for a sewing machine having a base and adapted to be mounted below the base of a sewing machine, which pinking mechanism comprises cooperating, relatively reciprocatory, pinking knives having converging cutting edges conjointly operable when mounted on a sewing machine to effect a V-shaped cut in a substantially horizontal plane, a lever for effecting relative, reciprocatory movement of the knives pivotally mounted below the cutting plane of the knives for oscillation about an axis substantially parallel to the cutting plane of the knives, means cooperating with the lever and one of the knives for maintaining the knives in yieldable engagement during cutting movement of the knives and means for positioning the pinking mechanism below the base of a sewing machine with one of said knives disposed above the base of the sewing machine.

50. A pinking mechanism for a sewing machine having a base and adapted to be mounted below the base of a sewing machine, which pinking mechanism comprises cooperating, relatively reciprocatory, pinking knives having converging cutting edges conjointly operable when mounted on a sewing machine to effect a V-shaped cut in a substantially horizontal plane, a lever for effecting relative, reciprocatory movement of the knives pivotally mounted below the cutting plane of the knives for oscillation about an axis substantially parallel to the cutting plane of the knives, one of said knives being pivotally mounted on the lever, means cooperating with the lever and the knife mounted thereon for maintaining the knives in yieldable engagement during cutting movement of the knives.

51. A pinking mechanism for a sewing machine having a base and adapted to be mounted below the base of the sewing machine, which pinking mechanism comprises a ledger blade having converging cutting edges and arranged to lie parallel to the base of the sewing machine, a lever pivotally mounted below the plane of the ledger blade for oscillation about an axis parallel to the plane of the ledger blade, a knife pivotally mounted on the lever for cooperation with the ledger blade, and means cooperating with the knife and lever for maintaining the knife in yieldable engagement with the ledger blade during cutting movement of the knife.

52. A pinking mechanism for a sewing machine having a base and adapted to be mounted below the base of the sewing machine, which pinking mechanism comprises a ledger blade having converging cutting edges and arranged to lie parallel to and spaced above the base of the sewing machine, a lever pivotally mounted below the plane of the ledger blade for oscillation about an axis parallel to the plane of the ledger blade, a knife having converging cutting edges pivotally mounted on the lever for cooperation with the ledger blade, and means cooperating with the knife and lever for maintaining the knife in yieldable engagement with the ledger blade during cutting movement of the knife.

53. A pinking mechanism for a sewing machine having a base and adapted to be mounted below the base of the sewing machine, which pinking mechanism comprises a ledger blade having an opening forming converging cutting edges and arranged and positioned to lie in a horizontal plane parallel to and spaced above the base of the sewing machine, a vertically reciprocatory knife supported below the plane of the ledger blade and having converging cutting edges for cooperation with the cutting edges of the ledger blade.

54. A pinking mechanism for a sewing machine having a base and adapted to be mounted below the base of the sewing machine, which pinking mechanism comprises a ledger blade having an opening forming converging cutting edges and arranged and positioned to lie in a horizontal plane parallel to and spaced above the base of the sewing machine, a vertically reciprocatory knife supported below the plane of the ledger blade and having converging cutting edges for cooperation with the cutting edges of the ledger blade, the angle of the cutting edges of the ledger blade being greater than the angle of the cutting edge of the knife.

55. A pinking mechanism for a sewing machine having a base and adapted to be mounted below the base of the sewing machine, which pinking mechanism comprises a ledger blade having an opening forming converging cutting edges and arranged and positioned to lie in a horizontal plane parallel to and spaced above the base of the sewing machine, a vertically reciprocatory knife supported below the plane of the ledger blade and having converging cutting edges for cooperation with the cutting edges of the ledger blade, and means for maintaining the cutting edges of the blade and knife in yieldable engagement with each other during cutting movement of the knife.

56. A pinking mechanism for a sewing machine having a base and adapted to be mounted below the base of the sewing machine, which pinking mechanism comprises a stationary ledger blade having an opening forming converging cutting edges and arranged and positioned to lie in a horizontal plane parallel to and spaced above the base of the sewing machine, a vertically reciprocatory knife supported below the plane of the ledger blade and having converging cutting edges for cooperation with the cutting edges of the ledger blade, and means cooperating with the knife for maintaining the cutting edges of the blade and knife in yieldable engagement with each other during cutting movements of the knife.

57. A pinking mechanism for a sewing machine having a base and adapted to be mounted below the base of the sewing machine, which pinking mechanism comprises a stationary ledger blade having an opening forming converging cutting edges and arranged and positioned to lie in a horizontal plane parallel to and spaced above the base of the sewing machine, a vertically reciprocatory knife supported below the plane of the ledger blade and having converging cutting edges for cooperation with the cutting edges of the ledger blade, the angle of the cutting edges of the ledger blade being greater than the angle of the cutting edges of the knife, and means for maintaining the cutting edges of the ledger blade and knife in yieldable engagement with each other during cutting movement of the knife.

58. A pinking mechanism for a sewing machine having a base and adapted to be mounted below the base of the sewing machine, which pinking mechanism comprises a stationary ledger blade having an opening forming converging cutting edges and arranged and positioned to lie in a horizontal plane parallel to and spaced above the base of the sewing machine, a vertically reciprocatory knife supported below the plane of the ledger blade and having converging cutting edges for cooperation with the cutting edges of the ledger blade, the angle of the cutting edges of the ledger blade being greater than the angle of the cutting edges of the knife, and means cooperating with the knife for maintaining the cutting edges of the ledger blade and knife in yieldable engagement with each other during cutting movement of the knife.

GEOFFREY STEVENSON.